United States Patent
Sprenger et al.

(10) Patent No.: US 11,022,567 B2
(45) Date of Patent: Jun. 1, 2021

(54) APPARATUS AND METHOD FOR PRODUCING AN IMAGE OF AN OBJECT BY ELECTROMAGNETIC RADIATION

(71) Applicant: HÜBNER GmbH & Co. KG, Kassel (DE)

(72) Inventors: Thorsten Sprenger, Lohfelden (DE); Maik-Hendrik Schubert, Göttingen-Herbershausen (DE); Yashar Khodaei, Lohfelden (DE); Thomas Rosenthal, Immenhausen (DE); Rahmi Salman, Staufenberg (DE); Ralph Zimmermann, Kassel (DE); Stefan Kose, Andernach (DE); Dirk Nüßler, Vettelschoß (DE); Ralf Brauns, Swisttal (DE)

(73) Assignee: HÜBNER GmbH & Co. KG, Kassel (DE)

( * ) Notice: Subject to any disclaimer, the term of this patent is extended or adjusted under 35 U.S.C. 154(b) by 305 days.

(21) Appl. No.: 16/316,359

(22) PCT Filed: Jul. 14, 2017

(86) PCT No.: PCT/EP2017/067874
§ 371 (c)(1),
(2) Date: Jan. 9, 2019

(87) PCT Pub. No.: WO2018/015302
PCT Pub. Date: Jan. 25, 2018

(65) Prior Publication Data
US 2020/0183001 A1    Jun. 11, 2020

(30) Foreign Application Priority Data
Jul. 19, 2016  (DE) .................. 10 2016 113 314.0

(51) Int. Cl.
*G01N 22/00* (2006.01)
*G01S 7/35* (2006.01)
(Continued)

(52) U.S. Cl.
CPC .............. *G01N 22/00* (2013.01); *G01S 7/352* (2013.01); *G01S 13/34* (2013.01); *G01S 13/89* (2013.01); *G01V 8/005* (2013.01); *H01Q 3/04* (2013.01)

(58) Field of Classification Search
CPC ....... G01N 22/00; G01S 13/88; G01S 13/888; G01S 13/887
See application file for complete search history.

(56) References Cited

U.S. PATENT DOCUMENTS 4,255,702 A * 3/1981 Tricoles ............. G01R 29/0814
324/637
5,933,120 A  8/1999 Manasson et al.
(Continued)

FOREIGN PATENT DOCUMENTS

DE   10 2015 203 743 B3   3/2016
JP      S58-132213 A       8/1983
WO   WO-2014/173831 A2   10/2014

OTHER PUBLICATIONS

Hommes, A., et al., "Inspection of Samples using a fast Millimetre Wave Scanner," Journal of Physics: Conference Series 307 (2011) 021033, 5 pages.

*Primary Examiner* — Peter M Bythrow
(74) *Attorney, Agent, or Firm* — Faegre Drinker Biddle & Reath LLP

(57) ABSTRACT

An apparatus for producing an image of an object by electromagnetic radiation includes a transmitting device for producing the electromagnetic radiation, a plurality of transmitting antennas connected to the transmitting device for emitting the electromagnetic radiation, a plurality of receiv- (Continued)

ing antennas, which receive the electromagnetic radiation emitted by the transmitting antennas, and a receiving device, connected to the plurality of receiving antennas, for receiving the electromagnetic radiation and a motor-driven rotating scanner. The transmitting antennas and the receiving antennas are arranged on the scanner. The scanner is set up in such a way that the transmitting antennas and the receiving antennas are rotatable at the same speed about an axis of rotation. The transmitting antennas and the receiving antennas are arranged in relation to one another in such a way that the object can be moved past them, and so in an operating mode of the apparatus the electromagnetic radiation is transported through the object or is reflected by the object.

19 Claims, 5 Drawing Sheets

(51) Int. Cl.
G01S 13/34 (2006.01)
G01S 13/89 (2006.01)
H01Q 3/04 (2006.01)
G01V 8/00 (2006.01)

(56) References Cited

U.S. PATENT DOCUMENTS

| | | | |
|---|---|---|---|
| 6,239,895 B1 | 5/2001 | Keeney et al. | |
| 6,480,141 B1* | 11/2002 | Toth | G01N 22/00 324/639 |
| 6,937,182 B2* | 8/2005 | Lovberg | G01S 13/887 342/179 |
| 6,965,340 B1* | 11/2005 | Baharav | G01S 13/89 342/22 |
| 8,674,875 B2* | 3/2014 | Carter | G01S 13/04 342/179 |
| 2008/0211724 A1* | 9/2008 | Anderton | G01V 8/005 343/703 |
| 2009/0195435 A1* | 8/2009 | Kapilevich | G01S 7/412 342/22 |
| 2010/0214150 A1* | 8/2010 | Lovberg | H01Q 3/06 342/22 |
| 2010/0265117 A1* | 10/2010 | Weiss | G01S 13/003 342/22 |
| 2012/0105267 A1* | 5/2012 | DeLia | G01V 8/005 342/22 |
| 2013/0021613 A1* | 1/2013 | Furxhi | G02B 26/10 356/445 |
| 2013/0321642 A1* | 12/2013 | Furxhi | G02B 26/0816 348/168 |
| 2015/0276928 A1* | 10/2015 | Bowers | H01Q 3/24 342/368 |
| 2016/0033423 A1* | 2/2016 | Nickel | G01V 8/005 324/637 |
| 2017/0188874 A1* | 7/2017 | Suhami | A61B 5/4547 |
| 2017/0242119 A1* | 8/2017 | Chekroun | G01S 13/904 |
| 2018/0301818 A1* | 10/2018 | Welle | G01S 13/88 |

* cited by examiner

APPARATUS AND METHOD FOR PRODUCING AN IMAGE OF AN OBJECT BY ELECTROMAGNETIC RADIATION

CROSS REFERENCE TO RELATED APPLICATIONS

This application is a National Stage of International Application No. PCT/EP2017/067874 filed Jul. 14, 2017, which claims benefit of German Patent Application No. 10 2016 113 314.0 filed Jul. 19, 2016, both of which are herein incorporated by reference in their entirety.

The present invention relates to an apparatus for producing an image of an object by electromagnetic radiation with a transmitting device for producing the electromagnetic radiation, a plurality of transmitting antennas connected to the transmitting device for emitting the electromagnetic radiation, a plurality of receiving antennas for the electromagnetic radiation emitted by the transmitting antennas, a receiving device connected to the plurality of receiving antennas for receiving the electromagnetic radiation and a motor-driven rotating scanner, wherein the transmitting antennas and the receiving antennas are arranged on the scanner, wherein the scanner is set up in such a way that the transmitting antennas and the receiving antennas are rotatable at the same speed about an axis of rotation.

The present invention also relates to a method for producing an image of an object by electromagnetic radiation with the steps: producing the electromagnetic radiation in a transmitting device, emitting the electromagnetic radiation using a plurality of transmitting antennas connected to the transmitting device simultaneously, receiving the electromagnetic radiation using a receiving device connected to a plurality of receiving antennas and rotating the transmitting antennas and the receiving antennas at the same speed about an axis of rotation.

Imaging systems on the basis of millimetre wave radiation are known from the state of the art. Such systems require complex and expensive transmitting and receiving devices for generating and detecting the electromagnetic millimetre wave radiation. There are no suitable receiving devices available for the millimetre wave radiation that record a plurality of pixels at the same time, as is the case e.g. for other wavelength ranges of electromagnetic radiation in the form of CCD cameras. The imaging apparatuses known from the state of the art therefore rely on a temporally successive, i.e. serial, generation of the individual pixels. For this, an object of which the image is to be captured using the electromagnetic radiation must in one way or another be scanned or screened pixel by pixel with the aid of the electromagnetic radiation.

In order to achieve a sufficient recording speed, known systems here rely on a superimposition of a linear translational movement of the object and a synchronous rotational movement of a transmitting antenna and a receiving antenna. The rotational movement of the transmitting and receiving antennas ensures the generation of the image lines, while the linear translational movement of the object ensures the necessary line feed.

From the German patent specification DE 10 2015 203 743 B3, an antenna arrangement for high-frequency scanning is known, with an antenna carrier rotatable about an axis of rotation, which has several antenna arms angularly offset relative to each other in a plane perpendicular to the axis of rotation which come from a central region of the antenna carrier through which the axis of rotation runs, several high-frequency antennas which are arranged on the antenna arms, high-frequency lines which run along the antenna arms from central regions to the high-frequency antennas and have frequency filters which each allow only one frequency range to pass through, and a high-frequency swivel coupling formed in the central region of the antenna carrier, via which high-frequency signals can be fed into the high-frequency lines of the rotatable antenna carrier or diverted away from the high-frequency lines, wherein the high-frequency filters of the high-frequency lines and the antenna arms allow different frequency ranges which do not overlap to pass through.

Compared with such an apparatus known from the state of the art, an object of the present invention is to provide an apparatus for producing an image of an object by electromagnetic radiation which is more convenient to manufacture. Another object of the present invention is to provide an apparatus for producing an image of an object by electromagnetic radiation which provides the same frequency bandwidth of the electromagnetic radiation for each pixel.

At least one of the previously named objects is achieved by an apparatus for producing an image of an object by electromagnetic radiation with a transmitting device for producing the electromagnetic radiation, a plurality of transmitting antennas connected to the transmitting device for emitting the electromagnetic radiation, a plurality of receiving antennas for the electromagnetic radiation emitted by the transmitting antennas, a receiving device connected to the plurality of receiving antennas for receiving the electromagnetic radiation and a motor-driven rotating scanner, wherein the transmitting antennas and the receiving antennas are arranged on the scanner, wherein the scanner is set up in such a way that the transmitting antennas and the receiving antennas are rotatable at the same speed about an axis of rotation, wherein the apparatus has a cover, arranged in beam paths of the electromagnetic radiation between the transmitting antennas and the receiving antennas, with a through-hole, and wherein the cover, the through-hole, the transmitting antennas and the receiving antennas are arranged relative to each other in such a way that during operation of the apparatus only the electromagnetic radiation of a beam path from precisely one transmitting antenna through the through-hole to precisely one receiving antenna is received by the receiving device, while all other beam paths are interrupted by the cover.

The basic principle of the present invention is to provide transmitting antennas in a larger number than the transmitting devices and to provide receiving antennas in a larger number than the receiving devices. In this way, the apparatus is simplified technically and becomes less expensive.

For this, each transmitting device is connected to a plurality of transmitting antennas for emitting the electromagnetic radiation and a plurality of receiving antennas is connected to each receiving device.

In one embodiment of the invention the apparatus has precisely one transmitting device, which is connected to a plurality of transmitting antennas, and in one embodiment the apparatus has precisely one receiving device, which is connected to a plurality of receiving antennas.

It is necessary to rotate the transmitting antennas and the receiving antennas with the aid of the scanner at the same speed about an axis of rotation, with the result that an object located in the beam path of the electromagnetic radiation between precisely one transmitting antenna and precisely one receiving antenna is swept substantially line by line by the beam path.

If, in an embodiment, the radius, i.e. the distance from the transmitting antennas and the receiving antennas to the axis of rotation, is great enough, then the movement of the transmitting antennas and the receiving antennas in the region of the object is still partially circular, but with a slight curvature, with the result that substantially a linear line of pixels is generated.

In an embodiment of the invention the radius, i.e. the radial distance from the transmitting antennas and the receiving antennas to the axis of rotation, is greater than, preferably twice the size of, the maximum width of an object of which the image can be generated with the aid of the apparatus.

It is understood that the transmitting antennas and the receiving antennas have to be arranged on the scanner in such a way that a beam path of the electromagnetic radiation from a transmitting antenna to a receiving antenna is formed in pairs in each case. For this, the rotational movements of all transmitting antennas and receiving antennas must be synchronous with each other.

It is understood that the apparatus according to the present invention can function both in transmission geometry and in reflection geometry. Depending on the geometry, transmitting and receiving antennas must be arranged either on the same side of the object (reflection geometry) or on opposite sides of the object (transmission geometry).

In an embodiment a transmitting antenna and receiving antenna pair can be formed by a single component, which is set up both to emit and to receive the electromagnetic radiation. It is understood that such an embodiment is suitable in particular for imaging in reflection geometry.

In an alternative embodiment the transmitting antenna and the receiving antenna of a pair of antennas are formed by separate components, i.e. by two antennas. It is understood that the apparatus in such an embodiment has the same number of transmitting antennas and of receiving antennas, with the result that there is one receiving antenna for each transmitting antenna.

If all pairs of transmitting antennas and receiving antennas connected to the same receiving device were now to simultaneously generate a signal in the receiving device, then it would no longer be possible to distinguish in which of the beam paths of the respective transmitting antenna and receiving antenna pairs the object to be captured is currently located. It is therefore central to the present invention to encode the individual pairs of transmitting antennas and receiving antennas in such a way that a clear allocation of the signal generated in the receiving device to the transmitting antenna and receiving antenna pair which is currently sweeping the object and illuminating it in this sense is made possible.

For this purpose, the apparatus has a cover for the electromagnetic radiation with a through-hole. This cover with the through-hole is designed in such a way that during operation of the apparatus it makes a signal generation by only precisely one transmitting antenna and receiving antenna pair possible, namely the pair which is currently sweeping the object. For this purpose the through-hole in the cover is designed in such a way that it makes an unhindered beam path from only precisely one transmitting antenna to precisely one receiving antenna across a line of the object possible. At the same time, all further beam paths between the further transmitting antenna and receiving antenna pairs are interrupted by the cover.

It is understood that the nature of the cover may also depend on the geometry of the beam path between the transmitting antennas and the receiving antenna. If the apparatus is operated in a reflection geometry, then it is advisable that the cover be absorbent, with the result that, when a transmitting antenna and receiving antenna pair is located in the region of the cover, i.e. not where the through-hole is arranged, the electromagnetic radiation emitted by the transmitting antenna is absorbed by the cover, with the result that the receiving antenna cannot relay any electromagnetic radiation to the receiving device.

If, on the other hand, the apparatus according to the invention is operated in a transmission geometry, then it is sufficient if the cover effectively interrupts the beam path, i.e. in particular reflects or absorbs the electromagnetic radiation, where it does not have the through-hole.

The apparatus according to the invention, compared with apparatuses from the state of the art in which an encoding of the pair of antennas which are currently sweeping a part of the object is based on a frequency filtering of the electromagnetic radiation emitted by the individual transmitting antennas, has the advantage that for each transmitting antenna and receiving antenna pair it provides the full bandwidth of the electromagnetic radiation generated by the transmitting device.

In an embodiment of the invention the electromagnetic radiation has a frequency or a frequency band in a range from 10 GHz to 15 THz, preferably from 40 GHz to 1.5 THz. In relation to a frequency band, this means that its centre frequency lies in the specified range. In this frequency range, transmitting devices and receiving devices are still very complex and expensive. Matrix-type arrangements of antennas and receiving devices in the form of arrows are practically not at all available.

In an embodiment of the invention the electromagnetic radiation has a frequency band with a bandwidth of 3 GHz or more, preferably of 4 GHz or more and particularly preferably of 8 GHz or more. With such a bandwidth, which is made available by each transmitting antenna, there is the possibility of spectroscopically evaluating the data obtained about each pixel, i.e. in particular its transmittance or reflectance. If, in an embodiment, the frequency band is divided into a plurality of individual spectra, then a hyperspectral evaluation of the frequency band can be effected.

It is understood that in such a case, in which it is necessary to evaluate information of a large bandwidth of the electromagnetic radiation, the receiving device requires a high data rate for the processing. Such a high data rate is provided in particular in a digital circuit for the receiving device and the transmitting device. In an embodiment of the invention the transmitting device and the receiving device are formed by a DDS system (Direct Digital Synthesis).

In an embodiment of the invention the transmitting device and the receiving device together form a frequency-modulated continuous wave radar (FMCW radar). This makes a radar operation with determination of the direction and the distance between the object and the transmitting or receiving antenna of the radar apparatus possible with a reasonable outlay on equipment.

The aim of FMCW radar is to determine the travel time of a radar signal emitted by a transmitting antenna and received by a receiving antenna, and thus the distance between the object and one of the antennas. The basis for the distance measurement is that the frequency of a monofrequent, narrow-band radar signal is varied over time. For example, over a time interval the frequency of the emitted signal increases continuously and linearly over time. If a part of the radar signal generated is now used as a reference signal and this reference signal is fed immediately to the receiving device, while the actual radar signal travels from the transmitting antenna via the object to the receiving antenna and the radar signal received by the receiving antenna is mixed with the reference signal in the receiving device, then the mixing process generates an intermediate frequency signal. The frequency of the intermediate frequency signal results from the different travel times of reference signal and radar signal. It is important here that the travel time of the radar signal is not greater than the predetermined time interval over which the frequency of the emitted radar signal is changed. If the generated intermediate frequency is now determined at the receiver, i.e. behind the mixer, then this is proportional to the distance between the transmitting antenna, or the receiving antenna, and an object reflecting the radar signal.

Expressed in other words, in the case of an FMCW radar the point in time of the emission of the radar signal is frequency-encoded within an interval in which the frequency of the emitted radar signal is varied.

In an alternative embodiment of the invention the transmitting device and the receiving device together form a system selected from a group consisting of a Stepped Frequency System, a noise or pseudo-noise system, a system for producing and detecting pulsed electromagnetic radiation, a continuous wave system, a PLL-based system, or a combination thereof.

In an embodiment of the invention the through-hole is formed by a slit in the cover. In such an embodiment it is expedient if all transmitting antennas, all receiving antennas and the through-hole have the same radial distance, i.e. measured perpendicular to the axis of rotation, from the axis of rotation, wherein the slit is designed in the form of a partial circular arc with a radius of curvature which is equal to the radial distance from the transmitting antennas and the receiving antennas to the axis of rotation.

In an embodiment of the invention the through-hole has an extent in the circumferential direction around the axis of rotation which is equal to or smaller than 360° divided by the number of receiving antennas connected to a receiving device.

It is understood that the cover has an extent in the radial direction such that it interrupts the beam paths from transmitting and receiving antenna pairs.

In an embodiment of the invention in which the apparatus functions in transmission geometry the scanner has a rotatable first turning device motor-driven about an axis of rotation, wherein the plurality of transmitting antennas is arranged on the first turning device, and a rotatable second turning device motor-driven about the axis of rotation, wherein the plurality of receiving antennas is arranged on the turning device, wherein the first turning device and the second turning device are designed in such a way that during operation of the apparatus the first turning device and the second turning device rotate at the same angular speed, wherein the transmitting antennas and the receiving antennas are arranged relative to each other in such a way that between a transmitting antenna and a receiving antenna in each case a gap is formed, through which the object can be moved, and wherein the cover with the through-hole is arranged in the gap between the transmitting antennas and the receiving antennas.

In such an embodiment the rotational movements of the first and the second turning devices of the scanner can be mechanically or electrically synchronized with each other.

In an embodiment of the invention the scanner has an absolute encoder for the angular position of the scanner, i.e. for its rotating parts in relation to the stationary parts. In this way the detection of the signal can be triggered at the beginning of the line or at the start of the through-hole in the circumferential direction. The beginning of the line typically coincides with the start of the sweep by the beam path of a pair consisting of one transmitting antenna and one receiving antenna over the region of the through-hole in the circumferential direction.

Such an absolute encoder for the angular position of the scanner makes it possible to adapt the angular speed of the scanner to the measurement task, i.e. the object to be captured.

In a first embodiment of the invention the transmitting device and/or the receiving device are also arranged on the scanner in such a way that during operation of the apparatus they perform a rotational movement about the axis of rotation. In this case the transmitting device and the receiving device are thus arranged rotatably on the scanner. Such an embodiment has the advantage that it does not require a swivel coupling for transferring the electromagnetic radiation from a fixed part into a rotating part. The electromagnetic radiation produced by the transmitting device in this case is divided in an also rotated power divider and relayed to the transmitting antennas, preferably in equal parts in relation to the power.

In an alternative embodiment of the invention the transmitting device and/or the receiving device are stationary, i.e. they are not also rotated during operation of the apparatus. This reduces the mass being moved, i.e. rotating. In such an embodiment, therefore, between the transmitting device and the transmitting antennas a swivel coupling is provided at the transition from a fixed part to a rotating part of the scanner, as is a power divider which is arranged rotating on the scanner. In an embodiment in which the receiving device is stationary a power divider and a swivel coupling are provided between the receiving antennas and the receiving device, wherein the power divider is arranged on the scanner in such a way that it is rotating.

The design with power dividers which rotate about the axis of rotation during operation of the apparatus makes it possible to use simple and cost-effective one-channel swivel couplings.

In an embodiment of the invention the scanner is set up in such a way that during operation of the apparatus it rotates at a rotation rate that can be set.

In an embodiment of the invention the scanner is set up in such a way that during operation of the apparatus it rotates at a rotation rate of at least 9 Hz, preferably of at least 15 Hz and particularly preferably of at least 50 Hz.

In a further embodiment of the present invention the number of transmitting antennas is equal to the number of receiving antennas, wherein the transmitting antennas have the same angular distances as the receiving antennas. Expressed in other words, all transmitting antennas and all receiving antennas are spaced apart from each other equidistantly in the circumferential direction.

In a further embodiment of the invention the apparatus has a transport device, which is set up in such a way that the object and the scanner are moveable linearly relative to each other, preferably in a direction perpendicular to the axis of rotation, with the result that the antennas sweep the object line by line.

It is understood that in an embodiment such a transport device is a transport device for the object to be imaged. An example of such a transport device is a conveyor belt, which transports the object past the transmitting and receiving antennas, wherein the transport path of the object twice intersects the circle described by the rotational movement of the transmitting and receiving antennas.

In an embodiment of the invention the apparatus has at least four transmitting antennas and at least four receiving antennas.

At least one of the previously named objects is additionally also achieved by a method for producing an image of an object by electromagnetic radiation with the steps: producing the electromagnetic radiation in a transmitting device, emitting the electromagnetic radiation using a plurality of transmitting antennas connected to the transmitting device simultaneously, receiving the electromagnetic radiation using a receiving device connected to a plurality of receiving antennas and rotating the transmitting antennas and the receiving antennas at the same speed about an axis of rotation, wherein only the electromagnetic radiation of a beam path from precisely one transmitting antenna through a through-hole in a cover to precisely one receiving antenna is received by the receiving device, while all other beam paths are interrupted by the cover.

Where aspects of the invention have been described previously with regard to the apparatus, these also apply to the corresponding method for monitoring the apparatus, and vice versa. If the method is carried out using an apparatus according to this invention, this apparatus has the corresponding devices for that. In particular, however, embodiments of the apparatus are suitable for carrying out the method.

Further features, advantages and possible applications of the present invention will become clear with reference to the following description of embodiments and the associated figures.

In the figures identical elements are given identical reference numbers.

In the embodiments represented an envelope 3, as the object, is to be examined for safety-related substances with the aid of the electromagnetic radiation, without being opened. The aim of the apparatuses is to record an image, i.e. a matrix-type arrangement of pixels or measurement points, of the object 2.

Figure 1:
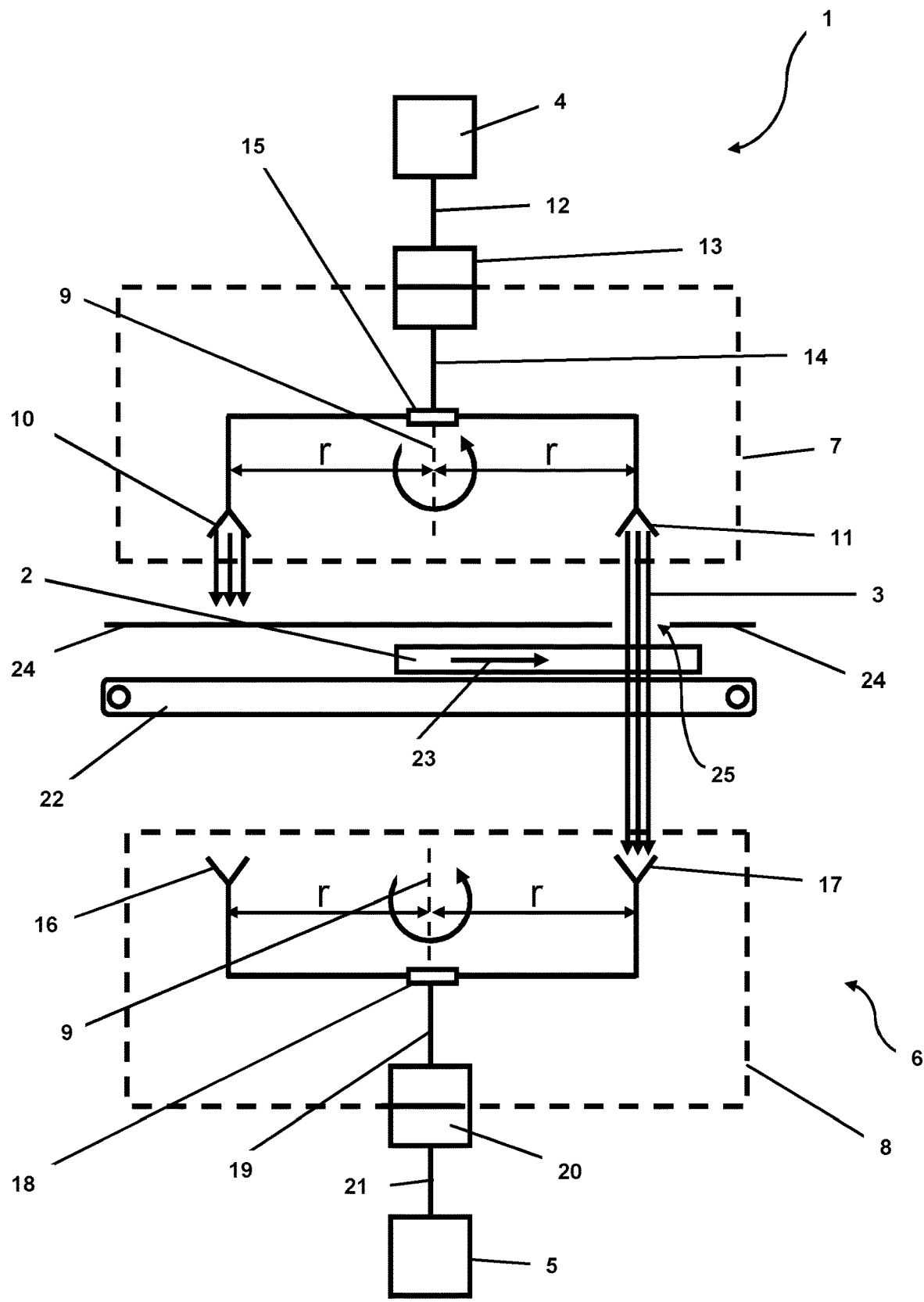
FIG. 1 is a schematic side view of a first embodiment of an apparatus according to the invention for producing an image of an object by electromagnetic radiation in transmission geometry.
Figure 2:
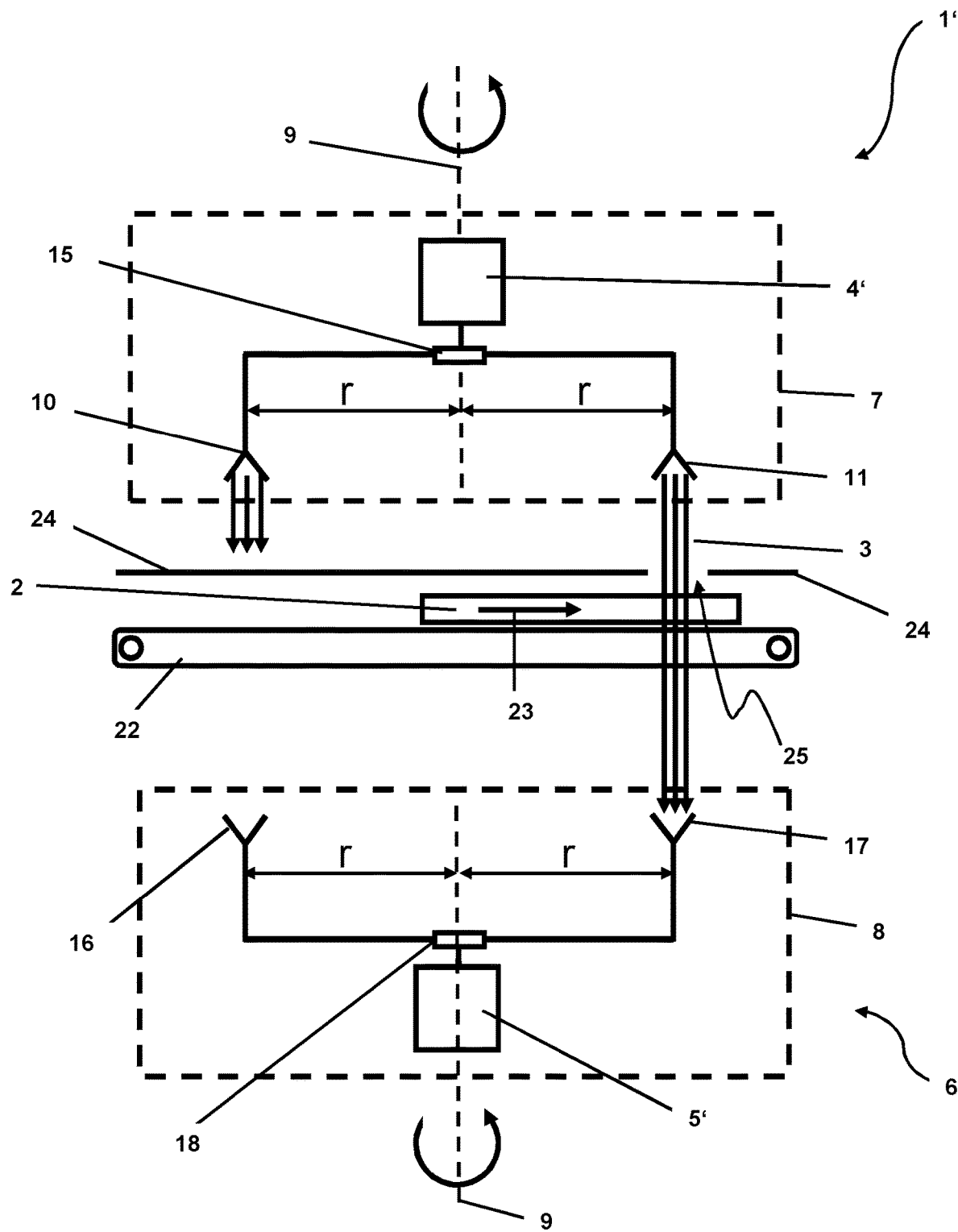
FIG. 2 is a schematic side view of a second embodiment of the apparatus according to the invention for producing an image of an object by electromagnetic radiation in transmission geometry.
Figure 3:
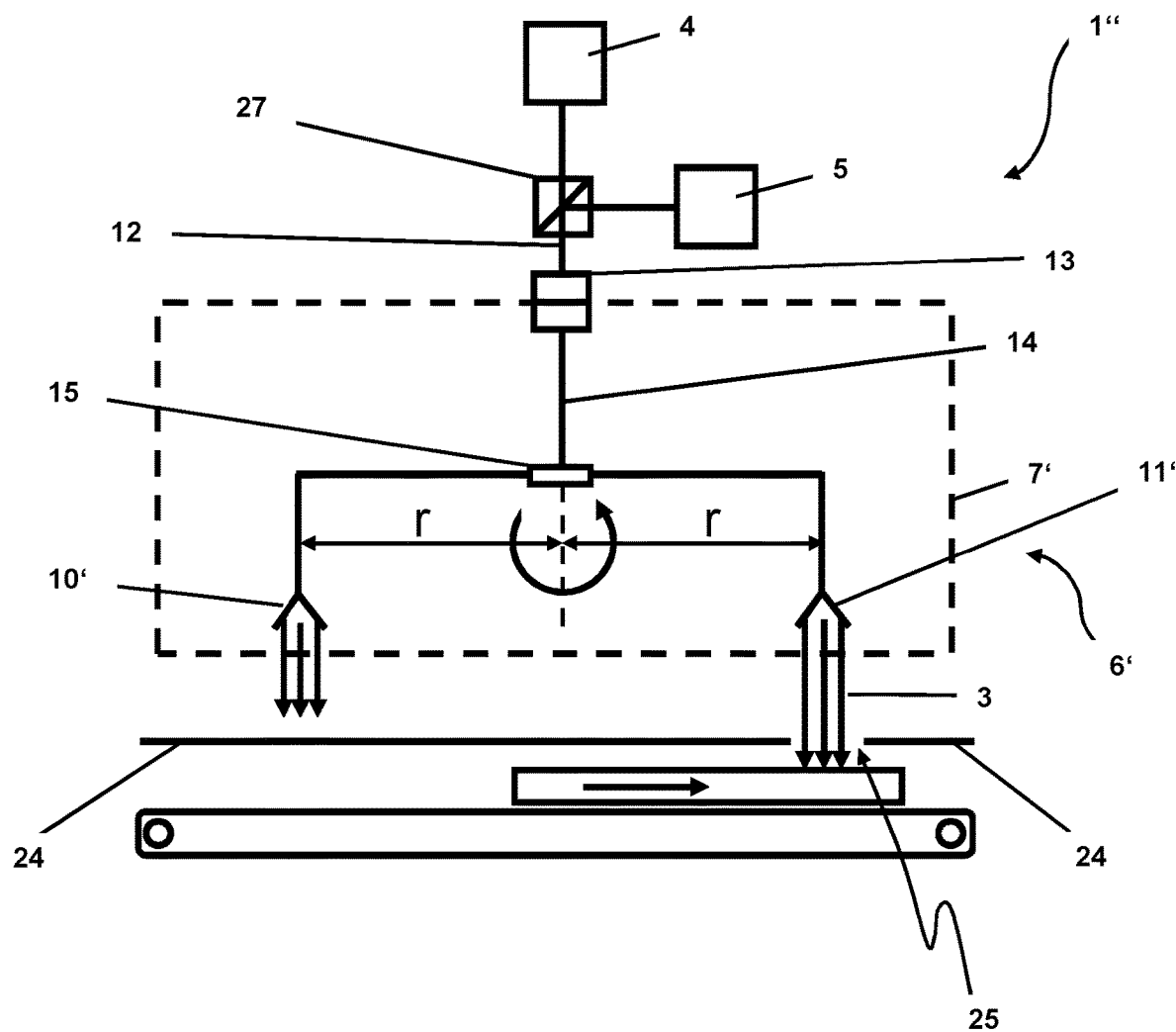
FIG. 3 is a schematic side view of a further embodiment of an apparatus according to the invention for producing an image of an object by electromagnetic radiation in reflection geometry.

The electromagnetic radiation 3 with which the envelope 2 is irradiated is high-frequency electromagnetic radiation with a bandwidth of 5 GHz and a centre frequency of 45 GHz in the embodiments of FIGS. 1 to 3. In order to generate and detect this high-frequency radiation 3, the apparatuses 1, 1', 1" from FIGS. 1 to 3 have a transmitting device 4, 4' and a receiving device 5, 5', which together form an FMCW radar based on a DDS system, such as is known from the state of the art.

FIG. 1 schematically shows a first embodiment of an imaging apparatus 1 according to the invention. This has a scanner 6, which consists of two turning devices 7, 8. In a practical realization of the turning devices 7, 8, these are formed by turntables, which act as carriers for the antennas 10, 11 and 16, 18.

Four transmitting antennas are mounted on the first turning device 7 of the scanner 6 at a radial distance r from the axis of rotation 9 of the turning device. Of these four transmitting antennas, two transmitting antennas 10, 11 are represented in the sketched representation from FIG. 1.

The feeding of the high-frequency signal generated by the transmitting device 4 to the transmitting antennas 10, 11 is effected via a feed line 12 initially up to a swivel coupling 13. In the swivel coupling 13 the high-frequency radiation is transferred from a stationary part, which does not rotate during operation of the apparatus 1, into a rotating part formed by the turning device 7. From the rotating end of the swivel coupling 13 a feed line 14 mounted on the turning device 7 leads to a power divider 15. The power divider distributes the electromagnetic radiation in equal parts in relation to the power onto the four transmitting antennas 10, 11. During operation of the apparatus 1, therefore, all four transmitting antennas 10, 11 simultaneously emit electromagnetic radiation 3 at approximately the same power.

Four receiving antennas are mounted on the second turning device 8 of the scanner 6 at a radial distance r from the axis of rotation 9 of the turning device 8. Of these four receiving antennas, two receiving antennas 16, 18 are represented in the sketched representation from FIG. 1.

The transmitting antennas 10, 11 or the receiving antennas 16, 17 are arranged on the first and second turning devices 7, 8 in such a way that they form a gap between themselves, into which the envelope 2 to be captured can be moved. It is understood that the four receiving antennas are also arranged at the same radial distance r from the axis of rotation 9 as the transmitting antennas 10, 11.

The transmitting and receiving antennas 10, 11 and 16, 17 interact in pairs in the sense that precisely one receiving antenna 17 always records the electromagnetic radiation 3 of precisely one transmitting antenna 11. For this purpose, the rotational movements of the two turning devices 7, 8 are synchronized. In the embodiments represented of FIGS. 1 and 2 the synchronization is effected by an electronic synchronization of the two drive motors (not represented) of the turning devices 7, 8.

On the receiver side, to some extent in a mirror image of the transmitter side, the receiving antennas 16, 17 are connected via lines to a power coupler 18, which brings together the signals from the receiving antennas 16, 17 onto one line 19. As described previously on the transmitter side, both the power coupler 18 and the line 19 are mounted on the turning device 8 and rotate with the antennas during operation of the apparatus. The line 19 in turn is connected to a swivel coupling 20, which transfers the electromagnetic radiation 3 from the turning device 8 into a stationary part of the apparatus 1. The swivel coupling 20 in turn is connected, on its stationary side, using a further stationary line 21 to the receiving device 5.

As the radial distance r from the antennas 10, 11, 16, 17 to the axis of rotation 9 is chosen to be much greater than the maximum width (dimension in a direction perpendicular to the paper plane) of the envelope 2 to be recorded, the orbital motion of the antennas 10, 11 and 16, 17 in the region of the object can be approximated well by a straight line, with the result that the rotational movement of the antennas 10, 11 and 16, 17 results in a line-by-line scanning of the object 2. A transport device in the form of a conveyor belt 22, which moves the envelope 2 through the electromagnetic radiation 3 ensures the line feed necessary in order to record a two-dimensional array of pixels. The direction of movement 23 of the conveyor belt 22 here is perpendicular to the axis of rotation 9. The path of the object 2 twice intersects the circular path described by the antennas 10, 11 and 16, 17.

The described apparatus 1 has the advantage that it requires only a single transmitting device 4 and only a single receiving device 5 and thus reduces costs compared with apparatuses which require a plurality of transmitting devices and receiving devices for image generation. However, this configuration demands that it be possible to receive and evaluate at any point in time only precisely the signal from a single transmitting antenna 11 and receiving antenna 17 pair in the receiving device 5. For this purpose, the apparatuses according to the invention have a cover given reference number 24. The cover 24 here is always arranged between transmitting antenna and object or between receiving antenna and object and designed in such a way that at any point in time electromagnetic radiation 3 is transferred only between a single transmitting antenna 11 and receiving antenna 17 pair. The electromagnetic radiation of all further transmitting antennas 10 is blocked or its beam path is interrupted by the cover 24. For this purpose, the cover 24 has a through-hole, which is formed by a slit 25 in the embodiments represented of FIGS. 1 to 3.

Figure 4:
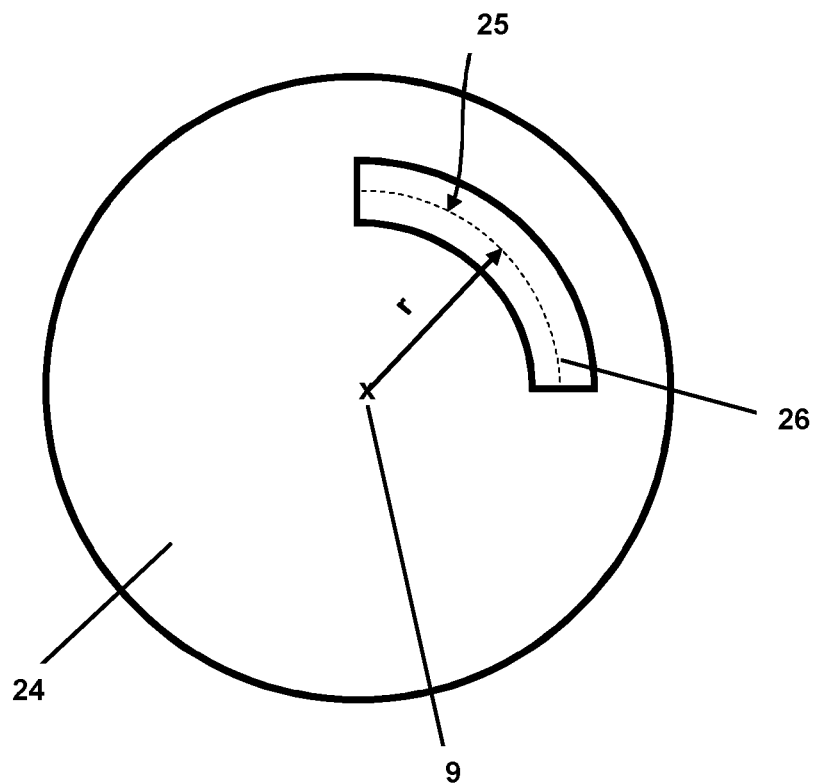
FIG. 4 is a schematic top view of an embodiment of the cover according to the invention from the apparatuses of FIGS. 1 to 3.

FIG. 4 shows a schematic representation of the cover 24 in a top view from above. The cover 24 from FIG. 4 is used in all three embodiments according to FIGS. 1 to 3, as described here. It is decisive that the cover 24 with the slit 25 is not also rotated. A slit 25 is clearly recognizable in the top view from FIG. 4. The slit 25 here is designed in the form of a circular arc and has a radial distance r from the axis of rotation 9 of the turning devices 7, 8 of the scanner which is equal to the radial distance r from the transmitting and receiving antennas 10, 11 and 16, 17 to the axis of rotation 9. The radial distance r of the slit 25 between the axis of rotation 9 and the centre 26 here is measured between the two edges of the cover 24 in the radial direction. In the circumferential direction the slit 25 extends over approximately 85°, with the result that it is guaranteed that at any point in time in each case only precisely one transmitting antenna 11 and receiving antenna 17 pair is located above or below the slit 25 and only this pair contributes to the generation of a signal in the receiving device 5 and thus to the pixel generation.

Figure 5:
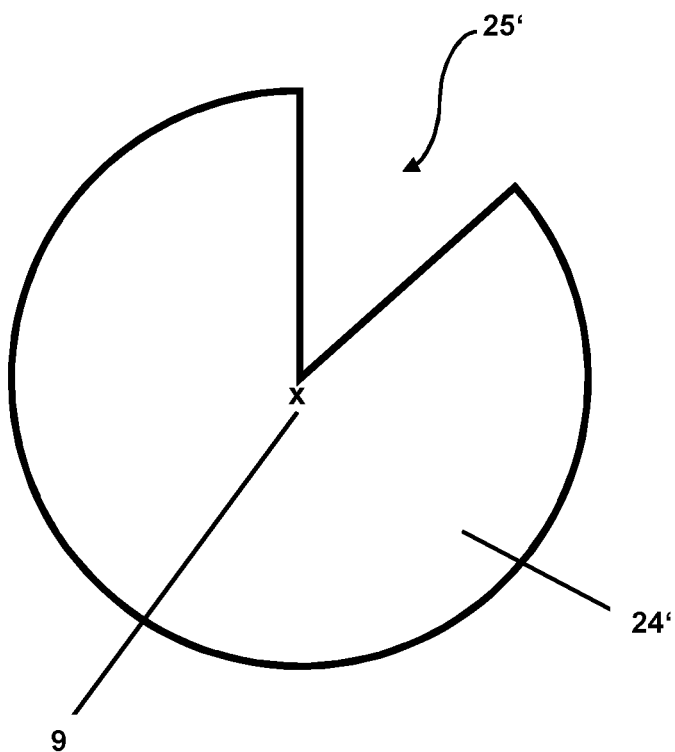
FIG. 5 is a schematic top view of an alternative embodiment of the cover according to the invention.

FIG. 5 is a schematic top view of an alternative embodiment of a cover 24' according to the present invention. In this cover 24' the through-hole 25' is designed in the shape of a slice of cake. The through-hole 25' here has an extent in the circumferential direction over an angle of less than 45°. In this way the cover 24' for an embodiment of the apparatus according to the invention is provided with 8 transmitting antennas and receiving antennas in each case.

In all three embodiments the scanners 6, 6' and turning devices 7, 7', 8 rotate at a rotation rate of 80 Hz, which corresponds in the case of four antenna pairs to a rotation rate of 320 Hz for an apparatus with only one antenna pair. Compared with an apparatus with only one antenna pair, the described embodiments therefore provide a quadrupling of the rotation rates and thus of the scanning rates. A further increase in the scanning rate can be achieved by an arrangement with more than four antenna pairs.

FIG. 2 schematically shows an alternative embodiment of the apparatus 1'. This differs from the arrangement from FIG. 1 in that the transmitting device 4' and the receiving device 5' are likewise arranged on the turning devices 7, 8 and during operation of the apparatus 1' rotate with the transmitting antennas 10, 11 and the receiving antennas 16, 17. The complex swivel couplings 13, 20 can therefore be dispensed with, which in turn makes the apparatus more cost-effective. The remaining components and the assembly thereof are identical to those from FIG. 1.

FIG. 3 on the other hand, in comparison with the embodiments from FIGS. 1 and 2, shows an arrangement in which the object 2 is captured in a reflection geometry instead of in a transmission geometry. In this arrangement the scanner 6' has only a single turning device 7'. The antennas 10', 11' in this case are transmitting and receiving antennas in one and the electromagnetic radiation 3 emitted by an antenna 11' is detected by the same antenna 11'. As in the embodiment of FIG. 1 the transmitting device 4 and the receiving device 5 are arranged stationary, i.e. they do not rotate with the turning device 7'. At the transition of the line from the fixed part of the apparatus to the rotating part 7', therefore, a swivel coupling 13 is again provided. A beam splitter 27 ensures that the electromagnetic radiation coming from the antennas 10' 11' acting as the receiving antennas is not conveyed back into the transmitting device 4, but rather into the receiving device 5.

For the purpose of original disclosure, it is pointed out that all features, as revealed to a person skilled in the art from the present description, the drawings and the claims, even if they have been described specifically only in connection with particular further features, can be combined both individually and in any combinations with others of the features or groups of features disclosed here, unless this has been explicitly ruled out or technical circumstances make such combinations impossible or meaningless. Merely for the sake of the brevity and readability of the description, the comprehensive, explicit representation of all conceivable combinations of features is dispensed with here.

While the invention has been represented and described in detail in the drawings and the above description, this representation and description is done merely by way of example and is not intended to limit the scope of protection as defined by the claims. The invention is not limited to the embodiments disclosed.

Modifications of the disclosed embodiments are obvious for a person skilled in the art from the drawings, the description and the attached claims. In the claims the word "to have" does not rule out other elements or steps, and the indefinite article "a" or "an" does not rule out a plurality. The mere fact that particular features are claimed in different claims does not rule out the combination thereof. Reference numbers in the claims are not intended to limit the scope of protection.

REFERENCE NUMBERS 1, 1', 1" imaging apparatus
2 object
3 high-frequency radiation
4, 4' transmitting device
5, 5' receiving device
6, 6' scanner
7 first turning device
7' turning device
8 second turning device
9 axis of rotation
10, 11 transmitting antenna
10' antenna
11' antenna
12, 14 feed line
13, 20 swivel coupling
15 power divider 16, 17 receiving antenna
18 power coupler
19, 21 line
20 swivel coupling
22 conveyor belt
23 direction of movement of the conveyor belt 22
24, 24' cover
25 slit
25' through-hole
26 centre

The invention claimed is:

1. An apparatus for producing an image of an object by electromagnetic radiation, comprising:
   a transmitting device for producing the electromagnetic radiation,
   a plurality of transmitting antennas connected to the transmitting device for emitting the electromagnetic radiation,
   a plurality of receiving antennas for the electromagnetic radiation emitted by the transmitting antennas,
   a receiving device connected to the plurality of receiving antennas for receiving the electromagnetic radiation and a motor-driven rotating scanner,
   wherein the transmitting antennas and the receiving antennas are arranged on the scanner,
   wherein the scanner is set up in such a way that the transmitting antennas and the receiving antennas are rotatable at the same speed about an axis of rotation,
   wherein the apparatus has a cover, arranged in beam paths of the electromagnetic radiation between the transmitting antennas and the receiving antennas, with a through-hole, and
   wherein the cover, the through-hole, the transmitting antennas and the receiving antennas are arranged relative to each other in such a way that during operation of the apparatus only the electromagnetic radiation of a beam path from precisely one transmitting antenna through the through-hole to precisely one receiving antenna is received by the receiving device, while all other beam paths are interrupted by the cover.

2. The apparatus according to claim 1, wherein the through-hole has an extent in the circumferential direction around the axis of rotation which is equal to or smaller than 360° divided by the number of receiving antennas.

3. The apparatus according to claim 1, wherein the through-hole is formed by a slit in the cover, wherein all transmitting antennas, all receiving antennas and the slit have the same radial distance from the axis of rotation, and wherein the slit is designed in the form of a partial circular arc with a radius of curvature which is equal to the radial distance from the transmitting antennas and the receiving antennas to the axis of rotation.

4. The apparatus according to claim 1, wherein the electromagnetic radiation has a frequency or a frequency band in a range from 10 GHz to 15 THz.

5. The apparatus according to claim 1, wherein the plurality of transmitting antennas is connected to the transmitting device in such a way that electromagnetic radiation with the same centre frequency, can be emitted by each transmitting antenna, and wherein the plurality of receiving antennas is connected to the receiving device in such a way that through the receiving device electromagnetic radiation with the same centre frequency can be received by each receiving antenna.

6. The apparatus according claim 1, wherein the scanner comprising:
   a rotatable first turning device motor-driven about an axis of rotation, wherein the plurality of transmitting antennas is arranged on the first turning device; and
   a rotatable second turning device motor-driven about the axis of rotation, wherein the plurality of receiving antennas is arranged on the second turning device,
   wherein the first turning device and the second turning device are designed in such a way that during operation of the apparatus the first turning device and the second turning device rotate at the same angular speed,
   wherein the transmitting antennas and the receiving antennas are arranged relative to each other in such a way that between a transmitting antenna and a receiving antenna in each case a gap is formed, through which the object can be moved, and
   wherein the cover with the through-hole is arranged in the gap between the transmitting antennas and the receiving antennas.

7. The apparatus according to claim 1, wherein the scanner has an absolute encoder for the angular position of the scanner.

8. The apparatus according to claim 1, wherein the transmitting device is arranged on the scanner in such a way that during operation of the apparatus it performs a rotational movement about the axis of rotation, wherein a first power divider is provided between the transmitting device and the transmitting antennas, wherein the receiving device is arranged on the scanner in such a way that during operation of the apparatus it performs a rotational movement about the axis of rotation, and wherein a second power coupler is provided between the receiving antennas and the receiving device.

9. The apparatus according to claim 1, wherein the transmitting device is arranged on the scanner in such a way that during operation of the apparatus it is stationary, wherein a first swivel coupling and a first power divider are provided between the transmitting device and the transmitting antennas, wherein the first power divider is arranged on the scanner in such a way that during operation of the apparatus it performs a rotational movement with the transmitting antennas, wherein the receiving device is arranged on the scanner in such a way that during operation of the apparatus it is stationary, wherein a second swivel coupling and a second power coupler are provided between the receiving antennas and the receiving device, and wherein the second power coupler is arranged on the scanner in such a way that during operation of the apparatus it performs a rotational movement with the receiving antennas.

10. The apparatus according to claim 1, wherein the scanner is set up in such a way that during operation of the apparatus it rotates at a rotation rate that can be set.

11. The apparatus according to claim 1, wherein the scanner is set up in such a way that during operation of the apparatus it rotates at a rotation rate of at least 9 Hz.

12. The apparatus according to claim 1, wherein the number of transmitting antennas is equal to the number of receiving antennas, and wherein all transmitting antennas are spaced apart from each other equidistantly in the circumferential direction and all receiving antennas are spaced apart from each other equidistantly in the circumferential direction.

13. The apparatus according to claim 1, further comprising a transport device, which is set up in such a way that the object and the scanner are moveable linearly relative to each other.

14. The apparatus according to claim 1, wherein the transmitting device and the receiving device together form an FMCW radar.

15. The apparatus according to claim 1, wherein the apparatus has at least four transmitting antennas and at least four receiving antennas.

16. A method for producing an image of an object by electromagnetic radiation comprising:
producing the electromagnetic radiation in a transmitting device;
emitting the electromagnetic radiation using a plurality of transmitting antennas connected to the transmitting device simultaneously;
receiving the electromagnetic radiation using a receiving device connected to a plurality of receiving antennas; and
rotating the transmitting antennas and the receiving antennas at the same speed about an axis of rotation,
wherein only the electromagnetic radiation of a beam path from precisely one transmitting antenna through a through-hole in a cover to precisely one receiving antenna is received by the receiving device, while all other beam paths are interrupted by the cover.

17. The apparatus according to claim 1, wherein the electromagnetic radiation has a frequency band with a bandwidth of 3 GHz or more.

18. The apparatus according to claim 5, wherein the plurality of transmitting antennas is connected to the transmitting device in such a way that electromagnetic radiation with the same bandwidth can be emitted by each transmitting antenna, and wherein the plurality of receiving antennas is connected to the receiving device in such a way that through the receiving device electromagnetic radiation with the same bandwidth can be received by each receiving antenna.

19. The apparatus according to claim 13, wherein the transport device is set up in such a way that the object and the scanner are moveable linearly relative to each other in a direction perpendicular to the axis of rotation.

* * * * *